United States Patent [19]

Ishizaki et al.

[11] Patent Number: 5,182,658
[45] Date of Patent: Jan. 26, 1993

[54] IMAGE PICKUP APPARATUS FOR CONTROLLING ACCUMULATION TIME IN PHOTOELECTRIC ELEMENTS

[75] Inventors: Akira Ishizaki; Kenji Suzuki; Keiji Ohtaka; Yasuo Suda, all of Yokohama, Japan

[73] Assignee: Canon Kabushiki Kaisha, Tokyo, Japan

[21] Appl. No.: 758,303

[22] Filed: Aug. 28, 1991

Related U.S. Application Data

[63] Continuation of Ser. No. 384,449, Jul. 25, 1989, abandoned.

[30] Foreign Application Priority Data

Jul. 27, 1988 [JP] Japan .................. 63-187270
Jul. 27, 1988 [JP] Japan .................. 63-187271

[51] Int. Cl.$^5$ .............................................. H04N 1/40
[52] U.S. Cl. ............................. 358/483; 358/213.11; 358/213.26; 358/213.19
[58] Field of Search ........... 358/471, 482, 483, 213.19, 358/213.26, 228, 213.29, 446, 213.11; 354/402; 250/214 AG

[56] References Cited

U.S. PATENT DOCUMENTS 4,701,626 10/1987 Ishizaki et al. ................. 358/213.19
4,835,561 5/1989 Matsui ............................ 354/403
4,835,615 5/1989 Taniguchi et al. ............. 358/213.26
5,008,698 4/1991 Muramatsu et al. ............ 354/402

Primary Examiner—Edward L. Coles, Sr.
Assistant Examiner—Jerome Grant, II
Attorney, Agent, or Firm—Fitzpatrick, Cella, Harper & Scinto

[57] ABSTRACT

There is provided an image pickup apparatus having a plurality of photoelectric converting elements which can accumulate the photoelectrically converted charges. This apparatus comprises: detecting circuiting for detecting whether the maximum value of outputs of the photoelectric converting elements has reaced a level near the saturation level thereof or not; time circuiting for timing a predetermined time from the start of the accumulation of the photoelectric converting elements; amplifying circuiting for amplifying outputs of the photoelectric converting elements; accumulation control circuiting for finishing the accumulating operation on the basis of either one of the facts that the detecting circuiting has detected that the maximum value had reached the saturation level, that the timer circuiting has timed the elapse of a predetermined time, and that the signal indicating that the output level of the photoelectric converting elements had reached the predetermined level has been input; and a variable gain circuit to determine an amplification factor of the amplifying circuiting in accordance with the output level of the photoelectric converting elements.

12 Claims, 5 Drawing Sheets ically converting device to detect the maximum and minimum values of an accumulation signal and for controlling an accumulation time, an apparatus disclosed in Japanese Patent Application No. 63-47644 or the like has been proposed by the same assignee as the present invention. Such an apparatus has largely contributed to improve the low contrast limit of the focus detecting apparatus.

IMAGE PICKUP APPARATUS FOR CONTROLLING ACCUMULATION TIME IN PHOTOELECTRIC ELEMENTS

This application is a continuation of application Ser. No. 07/384,449 filed Jul. 25, 1989, now abandoned.

BACKGROUND OF THE INVENTION

1. Field of the Invention

The present invention relates to an improvement in an accumulation time controlling and accumulation signal processing apparatus of a photoelectric converting device comprising a plurality of photoelectric converting elements used in a focus detecting apparatus of a passive system of a camera or the like.

2. Related Background Art

Hitherto, as an apparatus for allowing a photoelectric converting device to detect the maximum and minimum values of an accumulation signal and for controlling an accumulation time, an apparatus disclosed in Japanese Patent Application No. 63-47644 or the like has been proposed by the same assignee as the present invention. Such an apparatus has largely contributed to improve the low contrast limit of the focus detecting apparatus.

However, in the above apparatus, there is a case where the accumulation time largely differs due to the spatial luminance distribution of an object, that is, the intensity of contrast, so that the operation feeling of the camera deteriorates.

SUMMARY OF THE INVENTION

It is an object of the present invention to provide an image pickup apparatus in which the accumulation time can be made substantially constant irrespective of the state of the contrast of an object and the deterioration of the operation feeling of a camera can be eliminated.

To accomplish the above object, in a first aspect, the invention comprises: accumulation control means for finishing an accumulation operation on the basis of one of the facts that detecting means has detected that the maximum value had reached a saturation level, that timer means has timed the elapse of a predetermined time, and that level state signal generating means has inputted a signal indicating that the level of a differential signal had reached the level to permit the completion of the accumulation; and amplification factor varying means for determining an amplification factor of the amplifying means in accordance with the state of the level of the differential signal from the level state signal generating means, wherein the amplification factor is switched on the basis of the magnitudes of the maximum and minimum values of the accumulation signal at the end of the accumulation.

To accomplish the above object, in a second aspect, the invention comprises: accumulation control means for finishing an accumulating operation on the basis of one of the facts that detecting means has detected that the maximum value had reached a saturation level, that timer means has timed the elapse of a second predetermined time, that level state signal generating means has inputted a signal indicating that the level of a differential signal had reached a first level to permit the completion of the accumulation, and that the level state signal generating means has inputted a signal indicating that after the elapse of the first predetermined time had been timed by the timer means, the level of the differential signal reached a second level lower than the first level to permit the completion of the accumulation; and amplification factor varying means for determining an amplification factor of amplifying means in accordance with the state of the level of the differential signal from the level state signal generating means, wherein after the elapse of the relatively short first predetermined time from the start of the accumulation, the differential signal between the maximum and minimum values of the accumulation signal is compared with a plurality of predetermined levels, and the accumulation time and the amplification factor of the readout signal are determined in accordance with the results of the comparisons.

The above and other objects and features of the present invention will become apparent from the following detailed description and reference to the accompanying drawings.

DETAILED DESCRIPTION OF THE PREFERRED EMBODIMENTS

Figure 1:
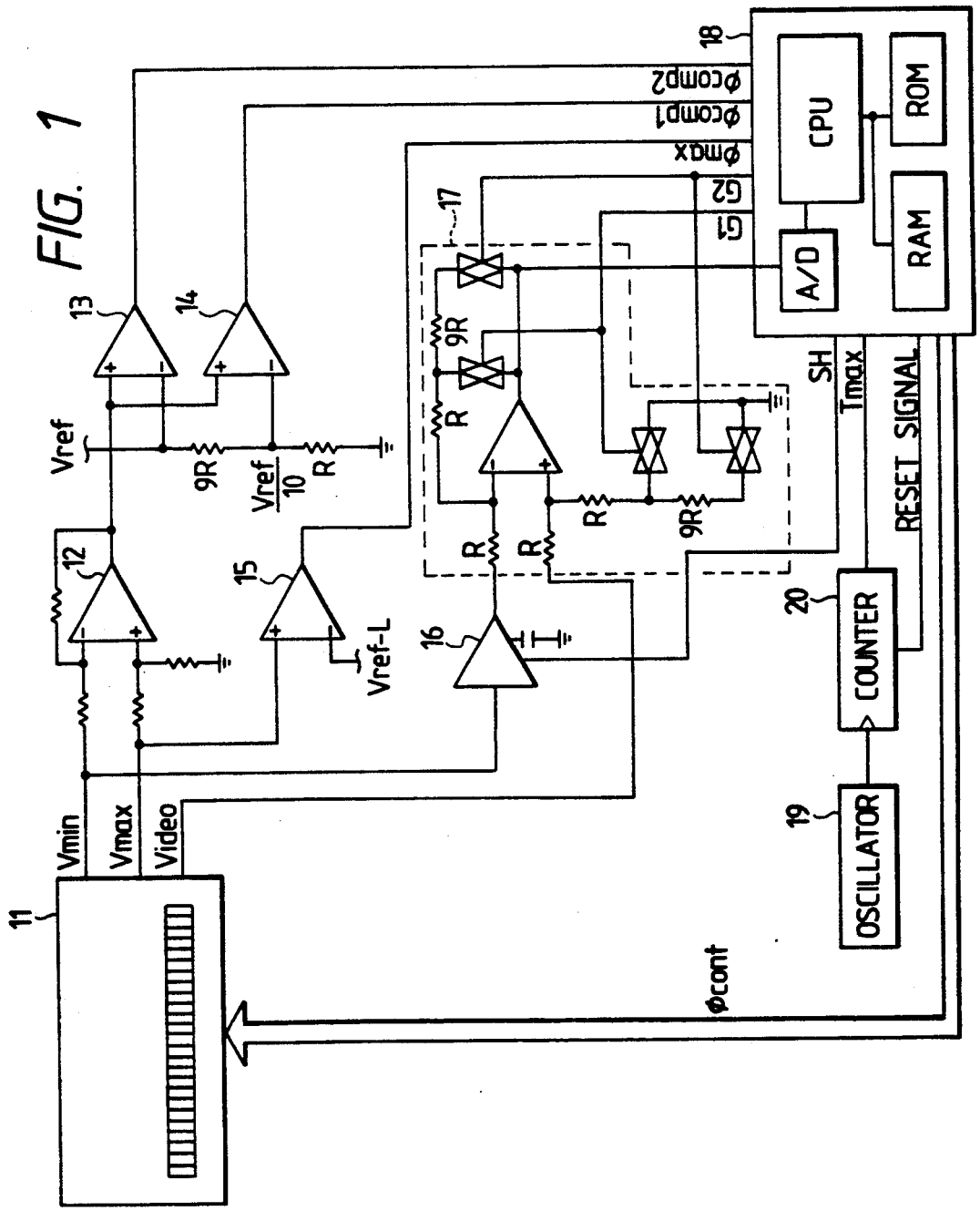
FIG. 1 is a block diagram showing the first embodiment of the present invention.
Figure 2:
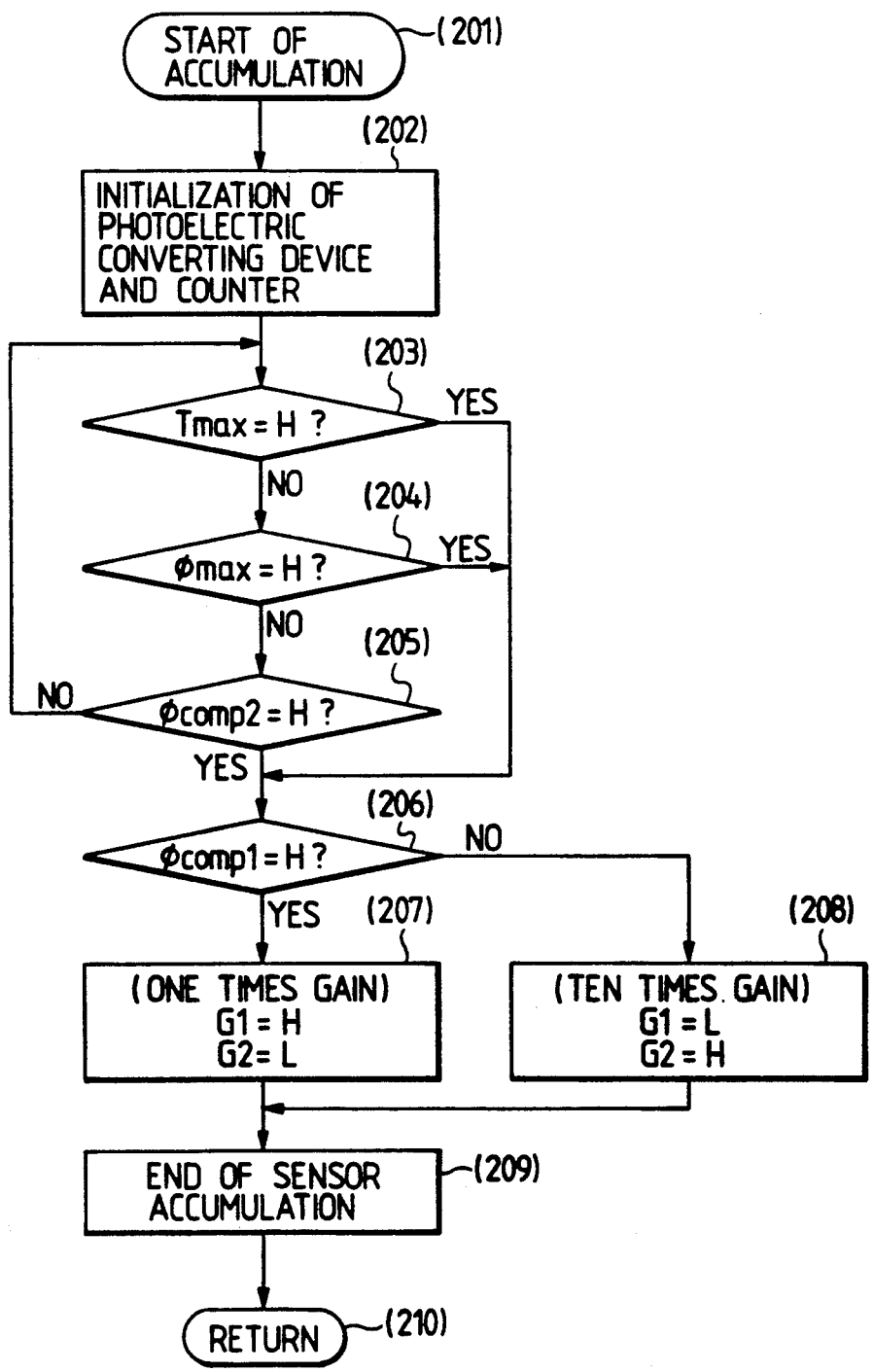
FIG. 2 is a flowchart for the first embodiment.
Figure 3:
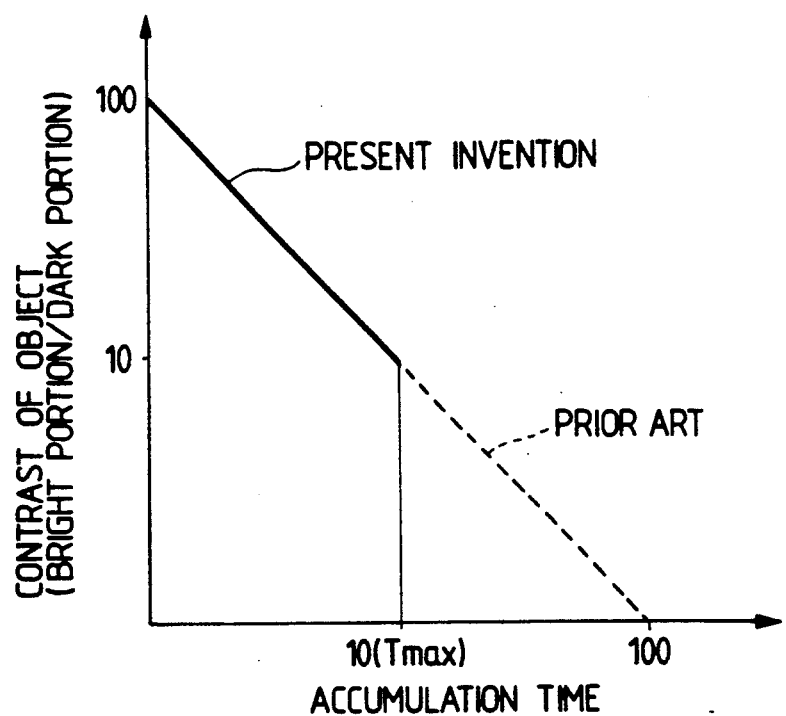
FIG. 3 is a diagram for explaining the effects of the first embodiment of the invention.

FIGS. 1 to 3 are diagrams showing the first embodiment of the present invention. FIG. 1 shows a circuit construction of an accumulation time controlling and accumulation signal processing apparatus of a photoelectric converting device. FIG. 2 is a flowchart for the first embodiment. FIG. 3 is a diagram showing the relation between the accumulation time and the contrast of an object.

In FIG. 1, reference numeral 11 denotes a photoelectric converting device comprising a plurality of photoelectric converting elements and having a function to detect the maximum value $V_{max}$ and the minimum value $V_{min}$ of an accumulation signal during the accumulation. The accumulation is controlled by a control signal $\phi_{cont}$. Reference numeral 12 denotes a differential amplifier to obtain the difference between the maximum value $V_{max}$ and the minimum value $V_{min}$; 13 and 14 indicate comparators for comparing the difference signal of the maximum value $V_{max}$ and the minimum value $V_{min}$ from the differential amplifier 12 with predetermined levels $V_{ref}$ and $V_{ref}/10$, respectively; 15 is a comparator for comparing the maximum value $V_{max}$ with a predetermined level $V_{ref-L}$ which is slightly lower than a saturation level of the photoelectric converting element; 16 is a memory circuit to store the minimum value $V_{min}$ at the end of the accumulation; and 17 is an amplifier to amplify an image signal $V_{ideo}$ from the photoelectric converting device 11 by using an output of the memory circuit 16 as a reference. An amplification factor (gain) of the amplifier 17 is switched to one time or ten times in accordance with a gain control signal $G_{cont}$ ($G_1$, $G_2$), which will be explained hereinlater. Practically speaking, when $G_1$=high level and $G_2$=low level, the gain of the amplifier 17 is set to one times and when $G_1$=low level and $G_2$=high level, the gain is set to ten times. Reference numeral 18 denotes a one-chip microcomputer having therein an A/D converter, a central processing unit (CPU), memories (RAM, ROM), etc. Reference numeral 19 indicates an oscillator and 20 represents a counter to count a predetermined time $T_{max}$ after the start of the accumulation.

The operation will be described in accordance with a flowchart of FIG. 2. FIG. 2 is described in the subroutine style. This is because, in general, such an accumulation control program of the sensor is not solely used and the describing method of the subroutine style has a generality.

In FIG. 2, the accumulation control subroutine is started in step (201). In step (202), the control signal $\phi_{cont}$ and a reset signal are generated to clear the signal in the photoelectric converting device 11 and to reset the counter 20. After completion of the initialization, the photoelectric converting device 11 is immediately automatically set to the accumulating mode.

In step (203), a check is made by a signal from the counter 20 to see if the predetermined time $T_{max}$ has elapsed after the start of the accumulating operation or not. If YES, the accumulation is finished and step (206) follows to determine the gain of the amplifier 17. If NO in step (203), step (204) follows.

In step (204), a check is made to see if the accumulation signal has reached the saturation level of the photoelectric converting device 11 or not. The discrimination in step (204) is made by checking a signal $\phi_{max}$ indicating whether the maximum value $V_{max}$ of the photoelectric converting device 11 has exceeded the level $V_{ref-L}$ near the saturation level or not. If the signal $\phi_{max}$ is at the high level as the result of the discrimination, the accumulation is finished and step (206) then follows to determine the gain of the amplifier 17. If the signal $\phi_{max}$ is not at the high level, the processing routine advances to step (205).

In step (205), a signal $\phi_{comp2}$ is checked to see if the difference between the maximum value $V_{max}$ and the minimum value $V_{min}$ of the photoelectric converting device 11 has reached the predetermined level $V_{ref}$ or not. If the signal $\phi_{comp2}$ is at the high level as the result of the discrimination, the accumulation is finished and step (206) follows to determine the gain of the amplifier 17. If the signal $\phi_{comp2}$ is not at the high level, the processing routine is returned to step (203).

In step (206), to decide the gain of the amplifier 17 when the accumulation signal is read out, a signal $\phi_{comp1}$ indicative of the result of the comparison of the difference between the maximum value $V_{max}$ and the minimum value $V_{min}$ and the predetermined level $V_{ref}/10$ is checked. If the signal $\phi_{comp1}$ is at the high level as the result of the discrimination, step (207) follows. If it is at the low level, step (208) follows.

Since the signal $\phi_{comp1}$ is at the high level in step (207) (when the signal $\phi_{comp2}$ is at the high level, the processing routine certainly advances to step (207)), $G_1$=high level (H) and $G_2$=low level (L) in order to set the gain of the amplifier 17 to one time. In this case, the contrast of the object is relatively high.

Since the signal $\phi_{comp1}$ is at the low level in step (208), $G_1$=low level and $G_2$=high level in order to set the gain of the amplifier 17 to ten times. In this case, the contrast of the object is relatively low.

In step (209), the control signal $\phi_{cont}$ is generated to finish the accumulation of the photoelectric converting device 11.

The above subroutive is finished in step (210).

Although the above embodiment has been described with respect to the case where the gain is switched between two levels, it will be obviously understood that the control can be further finely executed if the number of levels to be switched is increased.

FIG. 3 is a diagram for explaining the effects of the embodiment. The abscissa denotes an accumulation time and the ordinate indicates a contrast of an object. Both axes are logarithm axes. It is assumed that the luminances of the bright portions of the object are all equal for simplicity of explanation.

In the conventional example, since the accumulation time is simply expressed by a linear function of the contrast of the object, the accumulation time becomes long as the object contrast decreases. However, in the embodiment, when the object contrast is low, that is, in the case where even when the maximum value of the accumulation signal has reached the value near the saturation level, the difference between the maximum and minimum values does not reach the predetermined level $V_{ref}/10$, or even when the accumulation time reaches to the predetermined time decided by the system, that difference does not reach that predetermined level $V_{ref}/10$, the gain of ten times is selected, and in the case where that reference becomes greater than the predetermined level $V_{ref}$ during accumulation, the gain of one times is selected. This can provide an approximately constant accumulation time whether a contrast of an object is large or small. Therefore, deterioration of the operation feeling of the camera can be avoided. As described above, according to the first embodiment of the invention, there are provided: the accumulation control means for finishing the accumulating operation on the basis of one of the facts that the detecting means has detected that the maximum value had reached the saturation level, that the timer means has timed the predetermined time, or that the level state signal generating means has inputted the signal indicating that the level of the differential signal had reached the level to permit the completion of the accumulation; and the amplification factor varying means for determining the amplification factor of the amplifying means in accordance with the state of the level of the differential signal from the level state signal generating means, wherein the amplification factor is switched on the basis of the magnitudes of the maximum and minimum values of the accumulation signal at the end of the accumulation. Therefore, the accumulation time can be made substantially constant irrespective of the state of the contrast of an object and the deterioration of the operation feeling of a camera can be eliminated.

Figure 6:
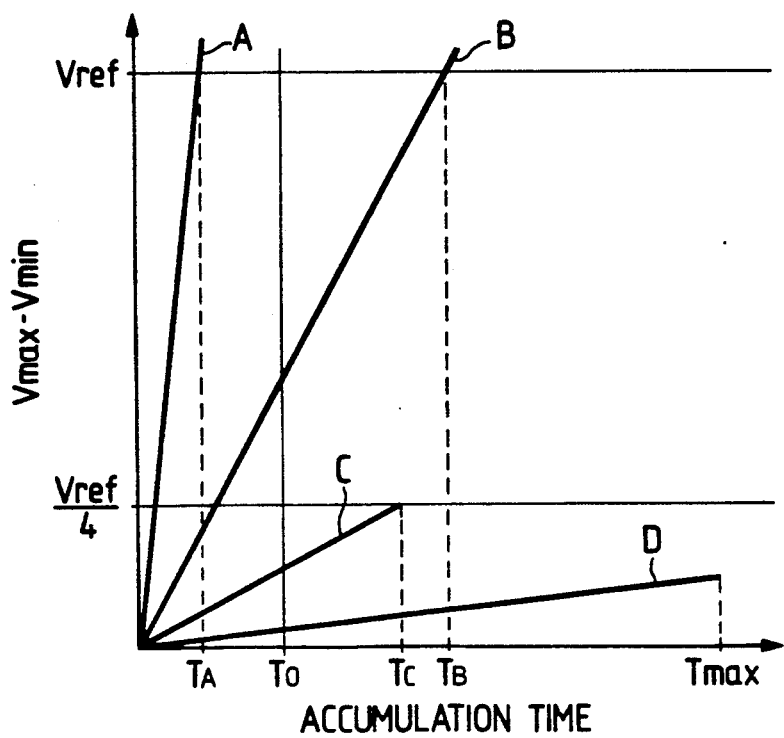
FIG. 6 is a diagram for explaining the effects of the second embodiment of the invention.
Figure 4:
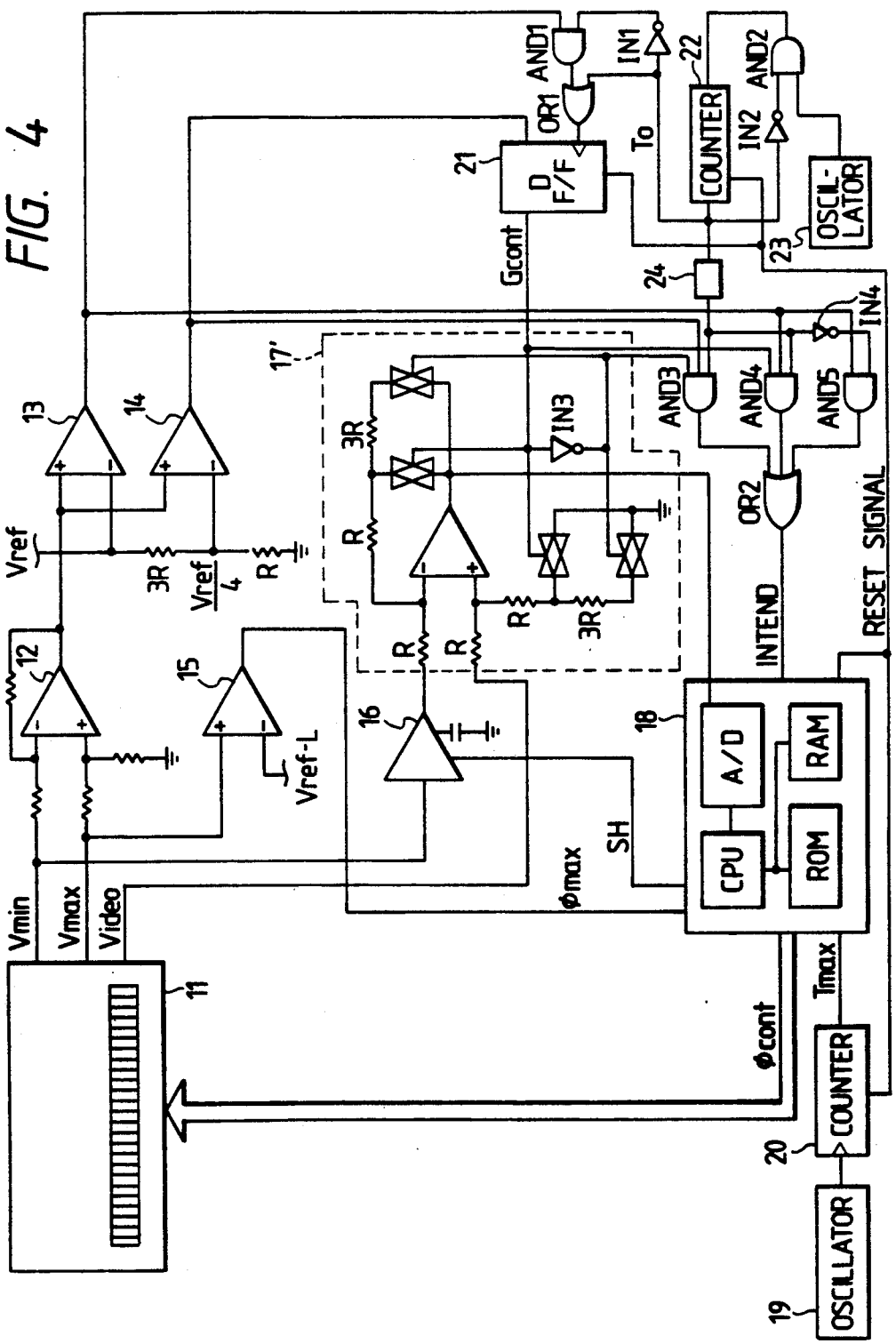
FIG. 4 is a block diagram showing the second embodiment of the invention.
Figure 5:
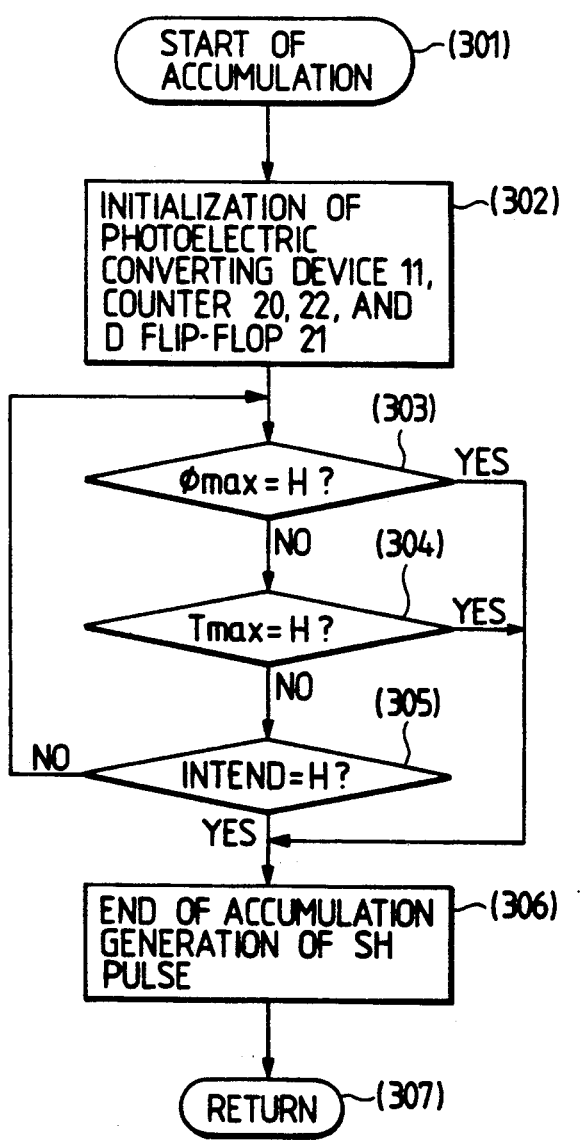
FIG. 5 is a flowchart for the second embodiment.

FIGS. 4 to 6 are diagrams showing the second embodiment of the invention. FIG. 4 shows a circuit construction of an accumulation controlling and accumulation signal processing apparatus of a photoelectric converting device. FIG. 5 shows a flowchart for the second embodiment. FIG. 6 shows the state of the accumulation time control. In the diagrams, the same parts and components as those shown in FIGS. 1 to 3 are designated by the same reference numerals.

The comparator 14 compares the differential signal of the maximum value $V_{max}$ and the minimum value $V_{min}$ from the differential amplifier 12 with the reference levels $V_{ref}$ and $V_{ref}/4$, respectively. Reference numeral 17' indicates an amplifier having the function to switch the amplification factor. The amplification factor is determined by an input gain control signal $G_{cont}$. Practically speaking, when the gain control signal $G_{cont}$ is at the high level, the gain is set to one time, when it is at the low level, the gain is set to four times. Reference numeral 21 indicates a D flip-flop; 22 represents a counter to count a predetermined time $T_0$ after the start of the accumulation; 23 an oscillator; and 24 a delay circuit to compensate the delay of the D flip-flop 21. $AND_1$ to $AND_5$ denote AND gates; $OR_1$ and $OR_2$ indicate OR gates; and $IN_1$ to $IN_4$ represent inverters.

The operation of the microcomputer 18 in the embodiment will be described with reference to the flowchart of FIG. 5. Thereafter, the accumulation control will be explained with reference to FIG. 6.

FIG. 5 is described in the subroutine style.

In FIG. 5, the accumulation control subroutine is started in step (301). In step (302), the control signal $\phi_{cont}$ and reset signal are generated to clear the signal of the photoelectric converting device 11 and to reset the counters 20 and 22 and the D flip-flop 21.

In step (303), a check is made to see if the accumulation signal has reached the saturation level or not. The above discrimination is made by checking the signal $\phi_{max}$ indicating whether the maximum value $V_{max}$ of the signal of the photoelectric converting device 11 has exceeded the reference level $V_{ref-L}$ near the saturation level of the photoelectric converting element or not. When the signal $\phi_{max}$ is at the high level, step (306) follows to immediately finish the accumulation. If the signal $\phi_{max}$ is not at the high level, step (304) follows.

In step (304), a check is made to see if the accumulation time has exceeded the predetermined time $T_{max}$ which is required by the system as a maximum accumulation time or not. If the predetermined time $T_{max}$ is at the high level, this means that the accumulation time has exceeded the predetermined time $T_{max}$, so that step (306) follows to finish the accumulation. If the signal $\phi_{max}$ is not at the high level, the processing routine advances to step (305).

In step (305), a check is made to see if an accumulation end signal INTEND has been set to the high level or not. The generation process of the accumulation end signal INTEND will be described in detail hereinafter with reference to FIG. 6. If the signal INTEND is at the high level, step (306) follows to finish the accumulation. If it is at the low level, the processing routine is returned to step (303).

In step (306), the control signal $\phi_{cont}$ is generated to finish the accumulating operation of the photoelectric converting device 11 and a pulse is sent to SH in order to store the minimum value $V_{min}$.

The above subroutine is finished in step (307).

The process of the accumulation time control as an important point of the embodiment will now be described with reference to FIG. 6. In FIG. 6, the abscissa denotes an accumulation time and the ordinate indicates a level of the differential signal of the maximum value $V_{max}$ and the minimum value $V_{min}$ of the accumulation signal.

The accumulation time control of the embodiment is classified into four cases A, B, C and D shown in FIG. 6.

The contrasts of the image which is projected to the photoelectric converting device 11 are set to high in accordance with the sequence of $A > B > C > D$.

A relates to the case where the accumulation end signal INTEND is set to the high level under the condition of the AND gate $AND_5$ in FIG. 4 and the accumulation is finished and where the difference between the maximum value $V_{max}$ and the minimum value $V_{max}$ and the minimum value $V_{min}$ of the accumulation signal reaches the maximum reference level $V_{ref}$ for the predetermined time $T_0$ from the start of the accumulation. In this case, at the time point $T_0$ upon completion of the accumulation, a clock is given to the D flip-flop 21 by the condition of the AND gate $AND_1$. At this time point, since the difference between the maximum value $V_{max}$ and the minimum value $V_{min}$ had already exceeded the reference level $V_{ref}/4$, the high level has been stored in the D flip-flop 21. Thus, the gain control signal $G_{cont}$ is set to the high level and the gain of the amplifier 17' when the image signal $V_{ideo}$ is read out is set to one time.

B relates to the case where the accumulation end signal INTEND is set to the high level under the condition of the AND gate $AND_4$ in FIG. 4 and the accumulation is finished and where the difference between the maximum value $V_{max}$ and the minimum value $V_{min}$ has already exceeded the second predetermined level $V_{ref}/4$ when the OR gate $OR_1$ outputs a high level signal for the predetermined time $T_0$ from the start of the accumulation. At this time, since the high level signal has been stored in the D flip flop 21, the gain control signal $G_{cont}$ is set to the high level. In this case, the accumulation is also continued after the predetermined time $T_0$. When the difference between the maximum value $V_{max}$ and the minimum value $V_{min}$ reaches the reference level $V_{ref}$, the AND gate $AND_4$ outputs a high level signal, so that the accumulation is finished. As mentioned above, since the gain control signal is at the high level, the gain of the amplifier 17' upon reading is set to one times.

C relates to the case where the accumulation signal INTEND is set to the high level under the condition of the AND gate $AND_3$ in FIG. 4 and the accumulation is finished and where the difference between the maximum value $V_{max}$ and the minimum value $V_{min}$ does not reach the second reference level $V_{ref}/4$ for the predetermined time $T_0$. At this time, the gain control signal $G_{cont}$ is set to the low level. The accumulation in this case is continued until the difference between the maximum value $V_{max}$ and the minimum value $V_{min}$ reaches the second reference level $V_{ref}/4$. When it has reached $V_{ref}/4$, the AND gate $AND_3$ outputs a high level signal and the accumulation is finished. As mentioned above, since the gain control signal $G_{cont}$ is at the low level, the gain of the amplifier 17' upon reading is set to four times.

D relates to the case where the contrast of an image is low and the accumulation time has reached the maximum accumulation time $T_{max}$ before the difference between the maximum value $V_{max}$ and the minimum value $V_{min}$ reaches $V_{ref}/4$, and at this time, the counter 20 is set to the high level, so that the accumulation is finished. In the flowchart of FIG. 5, the case of D is expressed in step (304). The gain of the amplifier 17' upon reading in such a case is obviously set to four times although not shown.

The embodiment has been described with respect to the example in which the two levels of $V_{ref}$ and $V_{ref}/4$ are used as comparison levels (reference levels) for the differential signal between the maximum value $V_{max}$ and the minimum value $V_{min}$. However, it will be obviously understood that the accumulation time control can be further finely executed if the number of comparison levels is increased.

According to the embodiment, as will be understood from C in FIG. 6, in the case where the level of the differential signal between the maximum value $V_{max}$ and the minimum value $V_{min}$ has reached the reference level $V_{ref}/4$ before the elapse of the predetermined time $T_{max}$ which is required by the system as a maximum accumulation time, the accumulating operation is immediately finished and the image signal $V_{ideo}$ is amplified four times upon reading. Therefore, the accumulation time in such an object contrast is reduced and an apparatus which can further optimally control the accumulation can be obtained as compared with that in the first embodiment.

We claim:

1. An image pickup apparatus comprising:
   a) an image pickup means comprising a plurality of photoelectric converting elements, each photoelectric converting element converting light incident thereon into an electrical image signal and accumulating the converted electrical signal for an accumulation time;
   b) first signal generating means for generating a first signal during the accumulation time, said first signal indicating whether a level of a predetermined one of the electrical image signals being accumulated by said plurality of photoelectric converting elements has reached a first predetermined level;
   c) second signal generating means for generating a second signal which indicates whether the accumulation time of the electrical image signals in said image pickup means has reached a predetermined time; and
   d) control means for controlling a completion of the accumulation of the electrical image signals in said image pickup means according to one of said first and second signals generated by said first and second signal generating means.

2. An apparatus according to claim 1, wherein said first signal generating means includes a comparator.

3. An apparatus according to claim 1, wherein said second signal generating means includes a counter.

4. An apparatus according to claim 1, further comprising:
   e) an amplifier for changing an amplifier factor in accordance with the level of the signal accumulated in said image pickup means.

5. An image pickup apparatus comprising:
   a) image pickup means comprising a plurality of photoelectric converting elements, each photoelectric converting element converting light incident thereon into an electrical image signal and accumulating the converted electrical signal for an accumulation time;
   b) first signal generating means for generating a first signal during the accumulation time, said first signal indicating whether a level of a predetermined one of the electrical image signals being accumulated by said plurality of photoelectric converting elements has reached a first predetermined level;
   c) control means for controlling a completion of the accumulation of the electrical image signals in said image pickup means according to said first signal generated by said first signal generating means; and
   d) an amplifier whose amplification factor is changeable in accordance with the level of the electrical image signal accumulated in said image pickup means for the controlled accumulation time.

6. An apparatus according to claim 5, wherein said first signal generating means includes a comparator.

7. An apparatus according to claim 5, further comprising:
   f) second signal generating means for generating a second signal which indicates that an accumulation time of the electrical signal in said image pickup means has reached a predetermined time, and for completing the accumulation of the electrical signal in the image pickup means irrespective of the first signal generated by said first signal generating means.

8. An apparatus according to claim 7, wherein said second signal generating means includes a counter.

9. An image pickup apparatus comprising:
   a) image pickup means comprising a plurality of photoelectric converting elements, each photoelectric converting element converting light incident thereon into an electrical image signal and accumulating the converted electrical signal for an accumulation time;
   b) detecting means for detecting a level of the electrical image signal being accumulated in said image pickup means during the accumulation time and outputting a detection signal;
   c) discriminating means for discriminating the accumulation time of the electrical image signal of said image pickup means according to said detection signal; and
   d) variable gain control means for controlling the accumulation time of said image pickup means in accordance with the detection signal output from said detecting means and for changing an amplification factor of the electrical image signal output from said image pickup means in accordance with the discriminated accumulation time.

10. An apparatus according to claim 9, wherein said detecting means includes a comparator.

11. An apparatus according to claim 9, wherein said discriminating means includes a counter.

12. An apparatus according to claim 9, wherein said variable gain control means includes an amplifier for amplifying the electrical signal which was read out of said image pickup means.

* * * * *

UNITED STATES PATENT AND TRADEMARK OFFICE
CERTIFICATE OF CORRECTION

PATENT NO. : 5,182,658

DATED : January 26, 1993

INVENTOR(S) : ISHIZAKI ET AL.

It is certified that error appears in the above-identified patent and that said Letters Patent is hereby corrected as shown below:

COLUMN 1

Line 23, "as" should read --of--.

COLUMN 3

Line 68, "subroutive" should read --subroutine--.

COLUMN 5

Line 1, "time, when" should read --times. When--.

Line 7, "AND ₅" should read --AND₅--.

Signed and Sealed this

Eighteenth Day of January, 1994

Attest:

BRUCE LEHMAN

Attesting Officer    Commissioner of Patents and Trademarks